2. Sheets. Sheet 1.
8318½X
S. N. Phelps,
Cook Stove.
Patented July 16. 1834.
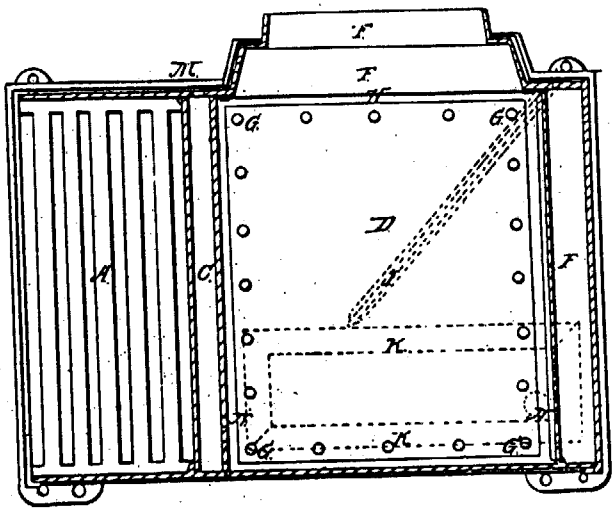
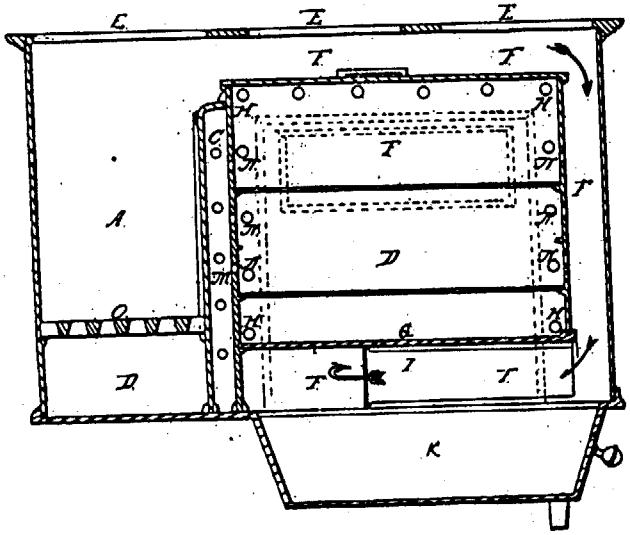

The spe... is not ...
8318½X
S. W. Phelps,
Cook Stove.
2. Sheets. Sheet. 2.
Patented July 16. 1834.
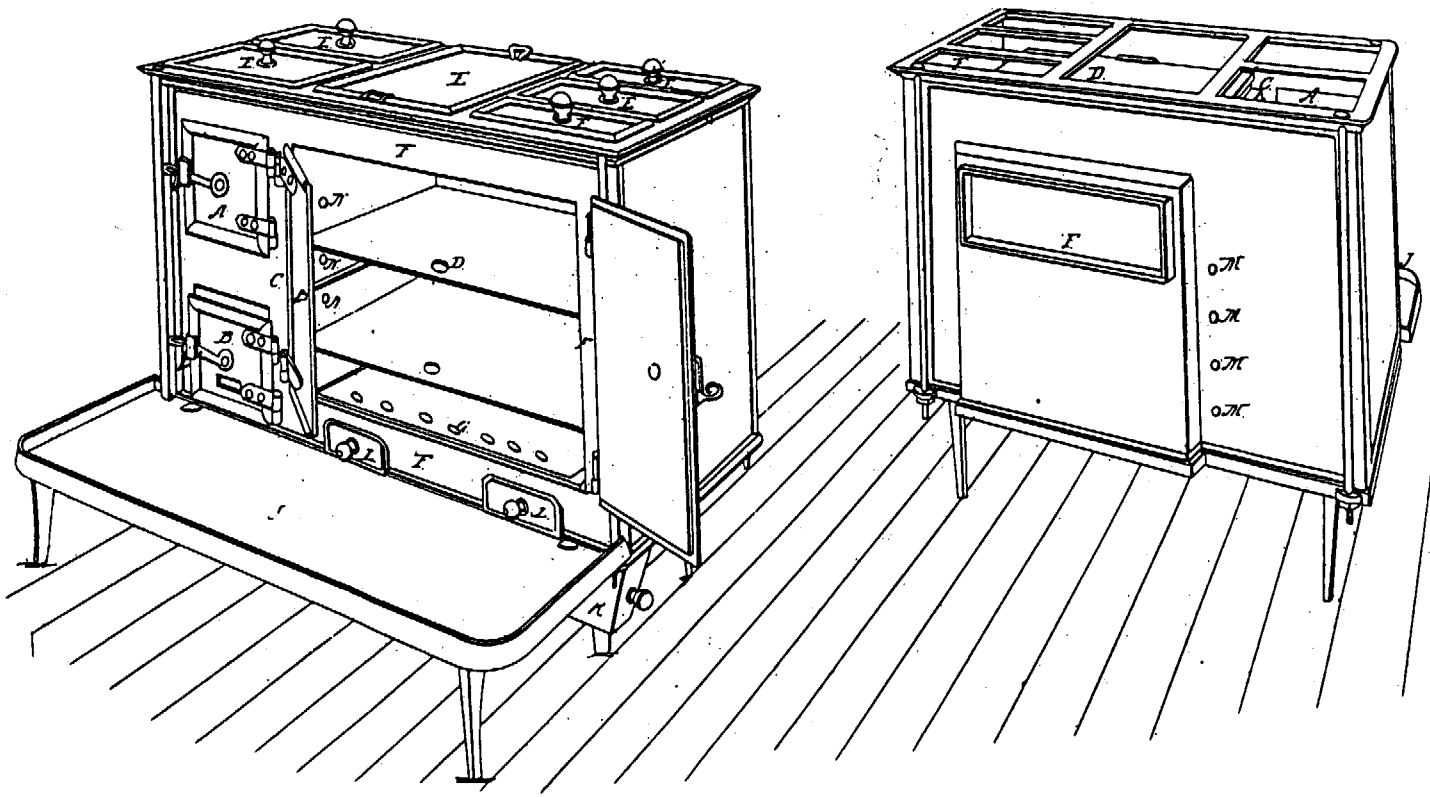

Samuel W. Phelps. of City of Cincinnati State of Ohio

Letters Patent.

8318½X

The schedule referred to in these Letters Patent and making part of the same
containing a description in the words of the said Samuel W. Phelps, himself of
his improvement in Cooking Stoves, called Phelps' Patent rarefying ^oven^ cook Stove To all persons to whom these presents shall come,
Be it known that I Samuel W Phelps, of the city of Cincinnati in the County of
Hamilton and State of Ohio have invented, constructed, made, and applied to use
a new and useful improvement in cooking stoves, called "Phelps' Patent rarefying
oven cook stove", specified in the words following, to wit.
The said Stoves are intended for steam boats, hotels &c and vary in size to
suit circumstances, they are made of wrought or cast iron, the second size is large
enough to cook for forty eighty to one hundred persons, it is three feet long two feet
high and two feet wide, one of the broad sides is the front of the stove, and
presents to view the fire place, the air chamber, the oven, and the ash pit. The boilers
are placed upon the top of the stove, and drop into it from one and a quarter, to
one and a half inch. The flue from the furnace extends beneath the boilers, and
over the top of the oven, thence down the side of the oven, farthest from the
furnace, thence beneath the bottom of the oven, thence against the back of it,
thence into the pipe. So that the oven is heated on every side except the front.
The bottom plate of the oven, and the back plate, are made of fire bed iron, sup
ported by cast iron frames or otherwise. The advantage of this is, that the bottom
and back of the oven, being subject to less heat than the sides near the furnace,
may be thinner than those sides, and thus all sides get equally heated in the
same time. X The bottom portion of the flue beneath the oven, is divided by a
partition commencing at its right hand side, back, and running diagonally for-
ward, to within nine inches of the front, the object of which is to carry the hot
smoke flame & air forward, and spread it well over the bottom of the oven be-
fore it takes to the back plate.
The advantages of having the flue pass out of the back of the stove, and not at the [illegible] where the furnace is situated [illegible] first [illegible] the back of the oven may
be heated, and [illegible] that [illegible] may [illegible] [illegible] a large one at the broad
side of the furnace [illegible] [illegible] [illegible] [illegible] a narrow one at the end
of the same for [illegible] &c. The oven extends from within 3 inches of the top of the stove, to
[illegible] inches of the bottom, and is 20 inches wide, and goes the whole depth of the stove 4-
[illegible] of the [illegible] [illegible] by a projection from the back flue which is 3 inches deep
and 18 broad, and terminates near the top in a common sized flue for a stove
of the above dimension The furnace is about 10 inches wide and goes back the whole depth of the stove
the grate at its bottom is ten inches above the bottom of the stove. The ash pit
is immediately below the grate. There is a [illegible] in the bottom plate of the stove below
the front part of the oven running lengthwise with the stove, 6 inches deep, 7
inches wide, and 20 inches long. A hearth extends the whole front of the stove, and is
one foot nine inches wide Between the furnace and oven [illegible] is an air chamber of the height of the oven
the depth of it, and one and a quarter inch wide in the clear. There are three
3/4 inch holes in the back or bottom of the air box to admit cold air; three similar
ones to let the heated air pass from the air box to the oven, and three similar
ones to let the air pass from out of the opposite side of the oven into the flue,
The number and size of these holes may vary, and stoppers be applied to
regulate the current of heated air, if necessary. The advantages of this air
chamber are great. It equalizes the heat of the oven, prevents the furnace from
burning one side of it before the other, and creates a current of fresh air
through the oven, preventing the amalgamation of the effluvia of the meats
[illegible] The size can be varied, that mentioned I have found by experience best
for the large stove. The various dimensions spoken of in this specification
can be altered to suit circumstances

I claim in the above specification the following improvements as being both new
and useful. 1st the flue passing as it does, out of the back of the oven, whereby the
back of the oven is heated, and room is left at the side & end of the furnace
[illegible] of the stove. 2d. the bottom and back plates of the oven are made thinner
than the other sides thereof in proportion to their distance from the source of
heat and thus each side of the oven become equally heated at [illegible] nearly

8318½X the same time. 3d. The air chamber, interposed between the furnace & the oven 4th. The convenient combination of these advantages in the most condensed and simple form for the use of steam boats, and hotels, &c.

In testimony that the above is a true specification of my said improvements I have hereunto set my hand and seal, this 7th day of July 1834 —

Witnesses
Thos. Wright }
Josiah Forbes }

S. W. Phelps

Drawing

Exd.
Chs.W.

1029 wds

July 16 1834